United States Patent
Qiu et al.

(10) Patent No.: US 12,287,776 B2
(45) Date of Patent: Apr. 29, 2025

(54) METHOD, APPARATUS AND DEVICE FOR PARALLEL EXECUTION OF SMART CONTRACT, AND MEDIUM

(71) Applicant: HANGZHOU HYPERCHAIN TECHNOLOGY CO., LTD., Hangzhou (CN)

(72) Inventors: Weiwei Qiu, Hangzhou (CN); Wei Li, Hangzhou (CN); Qi He, Hangzhou (CN); Yeqi Tao, Hangzhou (CN); Keting Yin, Hangzhou (CN); Qilei Li, Hangzhou (CN)

(73) Assignee: HANGZHOU HYPERCHAIN TECHNOLOGY CO., LTD., Hangzhou (CN)

( * ) Notice: Subject to any disclaimer, the term of this patent is extended or adjusted under 35 U.S.C. 154(b) by 526 days.

(21) Appl. No.: 17/636,366

(22) PCT Filed: Aug. 19, 2020

(86) PCT No.: PCT/CN2020/109984
§ 371 (c)(1),
(2) Date: Feb. 18, 2022

(87) PCT Pub. No.: WO2021/032115
PCT Pub. Date: Feb. 25, 2021

(65) Prior Publication Data
US 2022/0292082 A1   Sep. 15, 2022

(30) Foreign Application Priority Data

Aug. 19, 2019  (CN) .................. 201910764308.6
Nov. 27, 2019  (CN) .................. 201911180710.6

(51) Int. Cl.
*G06F 9/455*   (2018.01)
*G06F 16/23*   (2019.01)

(52) U.S. Cl.
CPC ...... *G06F 16/2379* (2019.01); *G06F 9/45558* (2013.01); *G06F 2009/4557* (2013.01)

(58) Field of Classification Search
CPC .................................................. G06F 9/45558
See application file for complete search history.

(56) References Cited

U.S. PATENT DOCUMENTS 7,305,554 B2 * 12/2007 Marquet ................. H04L 67/01
709/224

FOREIGN PATENT DOCUMENTS

| CN | 108537543 A | 9/2018 |
|---|---|---|
| CN | 108595157 A | 9/2018 |

(Continued)

OTHER PUBLICATIONS

China Office Action of 201911180710.6.
Notice of Reasons for Refusal of JP2022-510861.
International Search Report of PCT/CN2020/109984.

*Primary Examiner* — Charlie Sun

(57) ABSTRACT

A method, an apparatus and a device for parallel execution of a smart contract, and a medium are provided. The method for parallel execution of the smart contract includes the following steps: determining, according to a chain table for a cross-contract calling of each transaction in target execution transactions and the contract type of a smart contract in the target execution transactions, a calling dependency relationship between the transactions, and obtaining, according to the calling dependency relationship, transaction calling chains that cannot affect each other during an execution process.

17 Claims, 6 Drawing Sheets

(56) References Cited

FOREIGN PATENT DOCUMENTS

| | | |
|---|---|---|
| CN | 109636592 A | 4/2019 |
| CN | 109951547 A | 6/2019 |
| CN | 110300985 A | 10/2019 |
| CN | 110532038 A | 12/2019 |
| CN | 110968437 A | 4/2020 |
| WO | WO2019072283 A1 | 4/2019 |
| WO | WO2019072305 A1 | 4/2019 |
| WO | WO2019072310 A2 | 4/2019 |

* cited by examiner

METHOD, APPARATUS AND DEVICE FOR PARALLEL EXECUTION OF SMART CONTRACT, AND MEDIUM

CROSS-REFERENCE TO RELATED APPLICATIONS

This application is a National Stage application of International Application No. PCT/CN2020/109984 filed on Aug. 19, 2020, which claims all benefits accruing from China Patent Application No. 201910764308.6, filed on Aug. 19, 2019, titled "PARALLEL EXECUTION-METHODBASED ON JAVA SMART CONTRACT", and China Patent Application No. 201911180710.6, filed on Nov. 27, 2019, titled "METHOD, APPARATUS AND DEVICE FOR PARALLEL EXECUTION OF SINGLE CONTRACT BASED ON JAVA SMART CONTRACT, AND MEDIUM" in the China National Intellectual Property Administration, all of which are hereby incorporated by reference.

TECHNICAL FIELD

The present disclosure generally relates to the technical field of a blockchain, and in particular, to a method, an apparatus and a device for parallel execution of a smart contract, and a medium.

BACKGROUND

In a blockchain technology, the blockchain is a new decentralized protocol that can securely store digital currency transactions or other data, in which information cannot be forged or tampered with. A smart contract is a piece of code that can be deployed and executed in a blockchain network environment. The deployment and execution of this code can be presented in a form of transaction in the blockchain network, and the deployment and execution results can be recognized by the whole network along with the transaction. Since the results need to be delivered to a consensus layer for consensus, a result from this execution must be consistent on each node.

An execution engine of the smart contract of the blockchain in a traditional alliance includes an Ethereum virtual machine ("evm") and a Java virtual machine ("jvm"), but regardless of an execution of the evm or the jvm, all the execution of each packaged transaction of a block is executed completely serially. When there are more transactions in a block, a next transaction must completely wait for the completion of the execution of a previous transaction to start execution, which does not take full use of a multi-core feature of the currently general computer, thus limiting an execution performance of the smart contract of the blockchain to a certain extent. At the same time, if all transactions packaged into a block are simply parallel, concurrent operations on a same contract state may be involved because of the presence of cross-contract calls.

SUMMARY

In order to overcome a shortcoming of the prior art, it is an object of the present disclosure to provide a method, an apparatus, a device for parallel execution of a smart contract, and a medium.

According to one aspect of the present disclosure, a method for parallel execution of a smart contract is provided. The smart contract includes an annotation for a cross-contract calling, the method specifically includes the following steps: loading a smart contract in a first transaction, obtaining the annotation for the cross-contract calling in the smart contract in the first transaction by reflection, obtaining an address for the cross-contract calling corresponding to the annotation for the cross-contract calling and loading a smart contract corresponding to the address for the cross-contract calling, and obtaining, by recursion, a chain table for a cross-contract calling starting with an address of the contract called in the first transaction; determining, according to the chain table for the cross-contract calling of each transaction in target execution transactions and contract types of smart contracts in the target execution transactions, a calling dependency relationship of the transactions, and obtaining, according to the calling dependency relationship, transaction calling chains that do not affect each other during an execution process, the target execution transactions including the first transaction, and the contract types including a calling contract and a deployment contract; and executing the transaction calling chains in parallel in instances of virtual machines, each of the instances of the virtual machines executing a transaction calling chain and returning an execution result.

In some embodiments of the present disclosure, the determining, according to the chain table for the cross-contract calling of each transaction in target execution transactions and contract types of smart contracts in the target execution transactions, the calling dependency relationship of the transactions includes: in a case that the contract type of the first transaction is the calling contract and the chain table for the cross-contract calling includes a smart contract in a second transaction, placing the first transaction and the second transaction into the same transaction calling chain; and in a case that the contract type of the first transaction is the deployment contract, the first transaction forming a separate transaction calling chain.

In some embodiments of the present disclosure, after the obtaining the annotation for the cross-contract calling in the smart contract in the first transaction by reflection, the method includes: obtaining the address for the cross-contract calling corresponding to the annotation for the cross-contract calling, obtaining contract source codes corresponding to the address for the cross-contract calling from a ledger database, loading the contract source codes, and loading a plurality of the contract source codes being done in a consistent manner.

In some embodiments of the present disclosure, the determining, according to the chain table for the cross-contract calling of each transaction in target execution transactions and contract types of smart contracts in the target execution transactions, the calling dependency relationship of the transactions includes: traversing the chain table for the cross-contract calling of each transaction in the target execution transaction, and determining, according to all contract addresses included in each chain table for the cross-contract calling and the contract types of the smart contracts in the target execution transaction, the calling dependency relationship for the transactions.

In some embodiments of the present disclosure, after each of the instances of the virtual machines executing the transaction calling chain, the method includes: at the end of the execution of the transaction calling chains in all the instances of the virtual machines, returning execution results, and when one of the virtual machines does not return the execution result within a specified time, determining that all transactions executed by the virtual machine are illegal.

In some embodiments of the present disclosure, before the obtaining, according to the calling dependency relationship, transaction calling chains that do not affect each other during the execution process, the method further includes: in a case of calling a smart contract in the transaction calling chains, obtaining a method annotation of a method in the smart contract by reflection, and in a case that the method annotation has an annotation of @Parallel, determining, according to a method bytecode of the smart contract, whether the smart contract has a successfully registered contract method for parallel execution; and in a case that multiple transactions call the successfully registered contract method for parallel execution, analyzing calling parameters of the contract method in the transactions, in a case that the calling parameters are different, executing the contract method in parallel; in a case that the calling parameters are same, constructing a dependency relationship according to an order of the transactions and generating a directed acyclic graph to change the order of the transactions.

In some embodiments of the present disclosure, the method in the smart contract is a member method of a contract class.

In some embodiments of the present disclosure, the obtaining the method annotation of the method in the smart contract by reflection, and in the case that the method annotation has the annotation of @Parallel, determining, according to the method bytecode of the smart contract, whether the smart contract has the successfully registered contract method for parallel execution includes: a contract execution engine scanning the member method of the contract class by java reflection, and in a case that the member method of the contract class is scanned to have the annotation of @Parallel, the contract execution engine performing a bytecode check on the member method of the contract to determine whether the member method of the contract is the successfully registered contract method for parallel execution.

In some embodiments of the present disclosure, the determining, according to the method bytecode of the smart contract, whether the smart contract has the successfully registered contract method for parallel execution includes: obtaining a number and a type of method parameters of the method in the smart contract with the annotation of @Parallel, wherein the method in the smart contract obtains the parameters from a local variable table of a current method stack frame; parsing the method parameters and determining a registration failure in a case that the method parameters are operated by a modify type instruction or used as parameters to call other methods in the method bytecode; determining the registration failure in a case that the parameters is used by more than just a persistent variable of @StoreField.

In some embodiments of the present disclosure, after the determining, according to the method bytecode of the smart contract, whether the smart contract has the successfully registered contract method for parallel execution, the method includes: in a case that the smart contract has the successfully registered contract method for parallel execution, maintaining a method signature in a state data of the contract method, and the method signature comprising a name of the contract method, the number of the method parameters, and the type of the method parameters.

In some embodiments of the present disclosure, in a case that the calling parameters are same, constructing the dependency relationship according to the order of the transactions and generating the directed acyclic graph to change the order of the transactions includes: constructing the dependency relationship by generating the directed acyclic graph, when a transaction with a lower serial number and a transaction with a higher serial number have the same parameters, creating a dependency edge in the directed acyclic graph from the transaction with the higher serial number to the transaction with the lower serial number, wherein the serial number indicates an order in which the transaction is packed.

According to another aspect of the present disclosure, a method for parallel execution of a smart contract is provided. The smart contract includes an annotation for a cross-contract calling, the method specifically includes the following steps: at step one: when a blockchain node receives packaged transactions for execution, the blockchain firstly retrieving a corresponding contract source code from a ledger database according to a contract address specified in the transactions and loading the contract source code; at step two: for all contracts loaded, determining whether the annotation for the cross-contract calling is in the contracts through reflection, if yes, retrieving an address for the cross-contract calling, retrieving and loading a contract source code corresponding to the address from the ledger database, and performing an analysis of the address for the cross-contract calling in the contracts by recursion; finally, for each transaction, obtaining a chain table for the cross-contract calling starting with the address of the contract called by the current transaction; at step three: performing a calling dependency analysis of all transactions according to obtained contract calling chains corresponding to all transactions, when the contract of the transaction is a calling contract, traversing the obtained contract calling chain corresponding to this contract at step two, if the contract calling chain includes a contract involved in other transaction, placing the two transactions into a transaction calling chain, otherwise, the transaction being treated as a separate transaction calling chain; when the contract of the transaction is a deployment contract, the transaction being directly treated as a separate transaction calling chain; after performing the dependency analysis of all transactions, obtaining multiple transaction calling chains whose execution does not affect each other finally; and at step four: the multiple transaction calling chains obtained in step three, whose execution does not affect each other, being executed in parallel in multiple instances of virtual machines opened in advance, each virtual machine executing a transaction calling chain serially, and at the end of the execution of the chains in all virtual machines, results being collected and then returned to an upper layer for other operations.

In some embodiments of the present disclosure, at step two, the chain table for the cross-contract calling comprising all contract addresses involved in a current transaction execution and having a length of at least 1.

In some embodiments of the present disclosure, at step two, the ways the contract source code loaded and retrieved need to be consistent.

In some embodiments of the present disclosure, at step three, when performing the analysis and comparison, all contract addresses involved in all other transactions must be compared, which means that instead of terminating directly after finding a first identical address in a traversal process, the traversal continuing to find all of identical addresses.

In some embodiments of the present disclosure, at step four, when collecting the results, returning execution results only after all virtual machines finishing execution, if a virtual machine does not return within a specified time, then it is directly determined that all transactions executed by this virtual machine are illegal.

According to another aspect of the present disclosure, an apparatus for parallel execution of a smart contract is provided. The apparatus includes: a registering module configured for determining whether a method in a Java smart contract has an annotation of @Parallel, analyzing a Java bytecode of the method of the Java smart contract with the annotation of @Parallel, and determining whether the method is a successfully registered contract method for parallel execution; and a parsing module configured for determining whether the called contract has a successfully registered contract method for parallel execution firstly when initiating a contract calling, when multiple transactions in a current block call contract methods for parallel execution, a smart contract executor will analyze parameters passed to the contract methods in the transactions, and when the parameters for calling the contract are different, the contract methods will be executed in parallel; when the parameters are same, constructing a dependency relationship according to an order of the transactions in the block and generating a directed acyclic graph to change the order of the transactions.

In some embodiments of the present disclosure, the registering module includes: a parameter obtaining unit configured for obtaining a number and a type of parameters of the method in the Java smart contract with the annotation of @Parallel, and it is known that the method in the Java smart contract obtains the parameters from a local variable table of a current method stack frame, and when a method stack frame is called, it is known that the variables in the local variable table of the method stack frame are the parameters of the current method; a first parsing judgment unit configured for parsing whether method parameters obtained from the local variable table are operated by a modified type instruction or used as parameters to call other methods in a whole method bytecode, if yes, the registration will fail; and a second parsing judgment unit configured for determine whether the parameters are only used by persistent variable of @StoreField, if no, then the registration will also fail.

According to another aspect of the present disclosure, a device is provided. The apparatus includes: one or more processors; a memory for storing one or more programs. When the one or more programs are executed by the one or more processors such that the one or more processors implement a method for parallel execution of a smart contract as follows: determining whether a method in a Java smart contract has an annotation of @Parallel, analyzing a Java bytecode of the method of the Java smart contract with the annotation of @Parallel, and determining whether the method is a successfully registered contract method for parallel execution; and determining whether the called contract has a successfully registered contract method for parallel execution firstly when initiating a contract calling, when multiple transactions in a current block call contract methods for parallel execution, a smart contract executor will analyze parameters passed to the contract methods in the transactions, and when the parameters for calling the contract are different, the contract methods will be executed in parallel; when the parameters are same, constructing a dependency relationship according to an order of the transactions in the block and generating a directed acyclic graph to change the order of the transactions.

According to another aspect of the present disclosure, a computer-readable storage medium is provided. The computer-readable storage medium has stored a computer program, and the computer program is executed by a processor to implement a method for parallel execution of a smart contract as follows: determining whether a method in a Java smart contract has an annotation of @Parallel, analyzing a Java bytecode of the method of the Java smart contract with the annotation of @Parallel, and determining whether the method is a successfully registered contract method for parallel execution; and determining whether the called contract has a successfully registered contract method for parallel execution firstly when initiating a contract calling, when multiple transactions in a current block call contract methods for parallel execution, a smart contract executor will analyze parameters passed to the contract methods in the transactions, and when the parameters for calling the contract are different, the contract methods will be executed in parallel; when the parameters are same, constructing a dependency relationship according to an order of the transactions in the block and generating a directed acyclic graph to change the order of the transactions.

In the above method, the apparatus and the device for parallel execution of a smart contract, and the medium, the calling dependency relationship of the transactions is determined according to the chain table for the cross-contract calling of each transaction in the target execution transactions and the contract types of the smart contracts in the target execution transactions, and the transaction calling chains that do not affect each other during the execution process are obtained according to the calling dependency relationship. The transactions packaged into the block can be executed in parallel, thereby improving the execution efficiency, and furthermore, no concurrence problem occurs with regard to the modification of all state quantities during the process of parallel execution of the transactions.

DETAILED DESCRIPTION OF THE EMBODIMENTS

Figure 1:
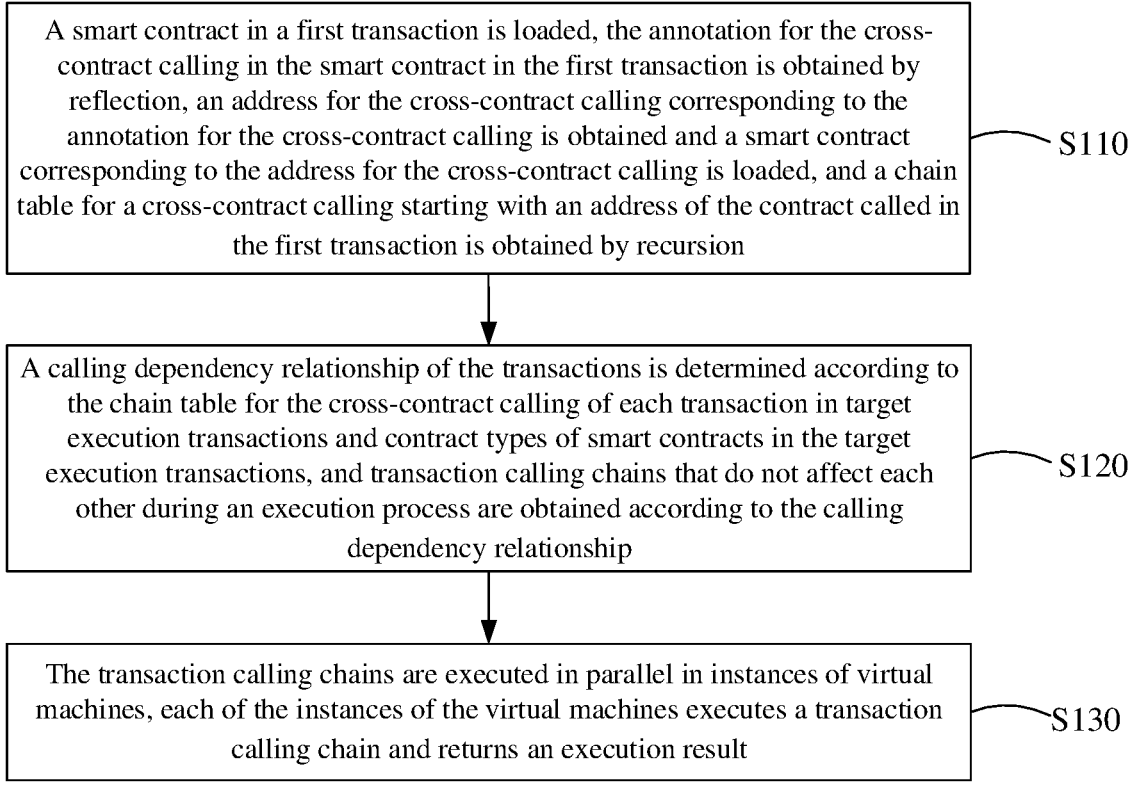
FIG. 1 is a flowchart diagram of a method for parallel execution of a smart contract according to an embodiment of the present disclosure.

In order to make the purposes, technical scheme and advantages of the present disclosure more obvious and understandable, the present disclosure is described and explained in combination with the attached drawings and examples. It should be understood that embodiments described herein are intended only to interpret and not to limit the present disclosure. Based on the embodiments provided in the present disclosure, all other embodiments obtained by a person skilled in the art without making creative effort are covered by the present disclosure.

It is apparent that the drawings in the following description are only some examples or embodiments of the present disclosure, and that the present disclosure can be applied to other similar scenarios based on the drawings without creative effort to the person skilled in the art. It is also understood that, although the efforts made in such development process may be complex and lengthy, some design, manufacturing or production changes based on the technical content disclosed in the present disclosure are only conventional technical means for the person skilled in the art related to the content disclosed in the present disclosure, and should not be construed as inadequate for the content disclosed in the present disclosure.

References to "embodiment" in the present disclosure mean that particular features, structures, or characteristics described in connection with an embodiment may be included in at least one embodiment of the present disclosure. The occurrence of the phrase at various points in the specification does not necessarily mean the same embodiment, nor is it a separate or alternative embodiment that is mutually exclusive with other embodiments. It is understood, both explicitly and implicitly, by the person skilled in the art that the embodiments described in the present disclosure may be combined with other embodiments without conflict.

Unless otherwise defined, technical terms or scientific terms involved in the present disclosure shall have the ordinary meaning as understood by a person of ordinary skill in the technical field to which the present disclosure belongs. The words "one", "a", "an", "the", "this" and similar words in the present disclosure do not indicate a limit to number, the words may be expressed in the singular or plural. The terms "include", "comprise", "has", and any variation thereof, as involved in the present disclosure, are intended to cover non-exclusive encompassment; for example, a process, a method, a system, a product or an apparatus that includes a series of steps or modules (units) is not limited to the listed steps or units, but may also include steps or units that are not listed, or may also include other steps or units that are inherent to the process, the method, the product or the apparatus. The terms "connect", "connected", "coupled" and similar terms involved in the present disclosure are not limited to physical or mechanical connections, but may include electrical connections, whether directly or indirectly. The term "plurality" as involved in the present disclosure refers to two or more. The word "and/or" describes the relationship of the associated objects and indicates that three relationships can exist, for example, "A and/or B" can indicate the presence of A alone, A and B together, and B alone. The character "/" generally indicates an "or" relationship between the associated objects before and after. The terms "first", "second", "third", etc. in the present disclosure are only to distinguish similar objects, and do not represent a specific ordering of objects.

FIG. 1 is a flowchart diagram of a method for parallel execution of a smart contract according to an embodiment of the present disclosure. As shown in FIG. 1, the present disclosure provides a method for parallel execution of a smart contract, the method includes the following steps: at step 110, a smart contract in a first transaction is loaded, the annotation for the cross-contract calling in the smart contract in the first transaction is obtained by reflection, an address for the cross-contract calling corresponding to the annotation for the cross-contract calling is obtained and a smart contract corresponding to the address for the cross-contract calling is loaded, and a chain table for a cross-contract calling starting with an address of the contract called in the first transaction is obtained by recursion. When a blockchain node receives packaged transactions for execution, the blockchain firstly retrieves a corresponding contract source code from a ledger database according to a contract address specified in the transactions and loads the contract source code. The above first transaction is one of the packaged transactions. For all contracts loaded, whether the annotation for the cross-contract calling is in the contracts is determined through reflection, if yes, an address for the cross-contract calling is retrieved, and a contract source code corresponding to the address is retrieved from the ledger database and loaded, and then whether the annotation for the cross-contract calling is in the contracts is determined through reflection again, and so on, a chain of the address for the cross-contract calling in the contracts is obtained by recursion. Finally, for each transaction, a chain table for the cross-contract calling starting with the address of the contract called by the current transaction is obtained. The chain table for the cross-contract calling involved is generated by analyzing the contract which is cross-contract called through recursion, including all the contract addresses involved in the current transaction execution with a length of at least 1. When obtaining the annotation for the cross-contract calling, it is necessary to obtain all the annotations for the cross-contract calling in the contract. The above reflection refers to a reflection mechanism in computer programming languages, which is self-checked at runtime and operates on internal members, i.e., a corresponding class or a function can be obtained by a string type.

At step 120, a calling dependency relationship of the transactions is determined according to the chain table for the cross-contract calling of each transaction in target execution transactions and contract types of smart contracts in the target execution transactions, and transaction calling chains that do not affect each other during an execution process are obtained according to the calling dependency relationship. The target execution transactions include the first transaction, and the contract types include a calling contract and a deployment contract.

In some embodiments of the present disclosure, in a case that the contract type of the first transaction is the calling contract and the chain table for the cross-contract calling includes a smart contract in a second transaction, the first transaction and the second transaction are placed into the same transaction calling chain; in a case that the contract type of the first transaction is the deployment contract, the first transaction forms a separate transaction calling chain. A calling dependency analysis of all transactions is performed according to obtained contract calling chains corresponding to all transactions, when the contract of the transaction is a calling contract, the obtained contract calling chain corresponding to this contract is traversed, if the contract calling chain includes a contract involved in other transaction, the two transactions are placed into a transaction calling chain, otherwise, the transaction is treated as a separate transaction calling chain. When the contract of the transaction is a deployment contract, the transaction is directly treated as a separate transaction calling chain. After performing the dependency analysis of all transactions, multiple transaction calling chains whose execution does not affect each other are finally obtained. The acquisition efficiency and accuracy of transaction calling chains can be further improved by choosing different merger modes for transaction chains according to contract types.

At step 130, the transaction calling chains are executed in parallel in instances of virtual machines, each of the instances of the virtual machines executes a transaction calling chain and returns an execution result. The multiple transaction calling chains obtained in step 120, whose execution does not affect each other, are executed in parallel in multiple instances of virtual machines opened in advance, each instance of virtual machine executes a transaction calling chain serially in a single virtual machine, and at the end of the execution of the chains in all virtual machines, results are collected and then returned to an upper layer for other operations.

In step 110 to step 130, the smart contract in the first transaction is loaded, the annotation for the cross-contract calling in the smart contract in the first transaction is obtained by reflection, the address for the cross-contract calling corresponding to the annotation for the cross-contract calling is obtained and the smart contract corresponding to the address for the cross-contract calling is loaded, and the chain table for the cross-contract calling starting with the address of the contract called in the first transaction is obtained by recursion. The calling dependency relationship of the transactions is determined according to the chain table for the cross-contract calling of each transaction in target execution transactions and contract types of smart contracts in the target execution transactions, and transaction calling chains that do not affect each other during the execution process are obtained according to the calling dependency relationship. The transactions packaged into the block can be executed in parallel, thereby improving the execution efficiency, and furthermore, no concurrency problem occurs with regard to the modification of all state quantities during the process of parallel execution of the transactions.

In some embodiments of the present disclosure, after the annotation for the cross-contract calling in the smart contract in the first transaction is obtained by reflection, the address for the cross-contract calling corresponding to the annotation for the cross-contract calling is obtained, contract source codes corresponding to the address for the cross-contract calling are obtained from a ledger database, and the contract source codes are loaded. The multiple contract source codes are loaded in a consistent manner, i.e., the annotation for the cross-contract calling in the smart contract in the first transaction is obtained by reflection, the address for the cross-contract calling corresponding to the annotation for the cross-contract calling is obtained and the smart contract corresponding to the address for the cross-contract calling is loaded, and the chain table for the cross-contract calling starting with the address of the contract called in the first transaction is obtained by recursion.

In some embodiments of the present disclosure, the chain table for the cross-contract calling of each transaction in the target execution transaction is traversed, and the calling dependency relationship for the transactions is determined according to all contract addresses included in each chain table for the cross-contract calling and the contract types of the smart contracts in the target execution transaction. When the contract calling chain corresponding to the called contract is traversed, all contract addresses involved in all other transactions must be compared, and whenever the same address is found to exist, then the two transactions need to be placed into a transaction calling chain. In other words, instead of terminating directly after finding a first identical address in a traversal process, the traversal continues to find all identical addresses. The present embodiment allows the finally obtained transaction calling chain to be mutually independent, improving the reliability of the transaction calling chain.

In some embodiments of the present disclosure, after each of the instances of the virtual machines executes the transaction calling chain, at the end of the execution of the transaction calling chains in all the instances of the virtual machines, execution results are returned, and when one of the virtual machines does not return the execution result within a specified time, all transactions executed by the virtual machine are determined to be illegal. By opening multiple virtual machines, each of which is multi-threaded, a collection of results requires waiting for all virtual machines to finish execution before returning the results. By executing block transactions in parallel in the instances of the virtual machines, a multi-core feature of general computers and computing resources are fully utilized. If the virtual machine does not return the result within the specified time, then all transactions executed by the virtual machine are directly determined to be illegal, and data concurrency problems arising during parallel execution of transactions are also avoided.

Figure 2:
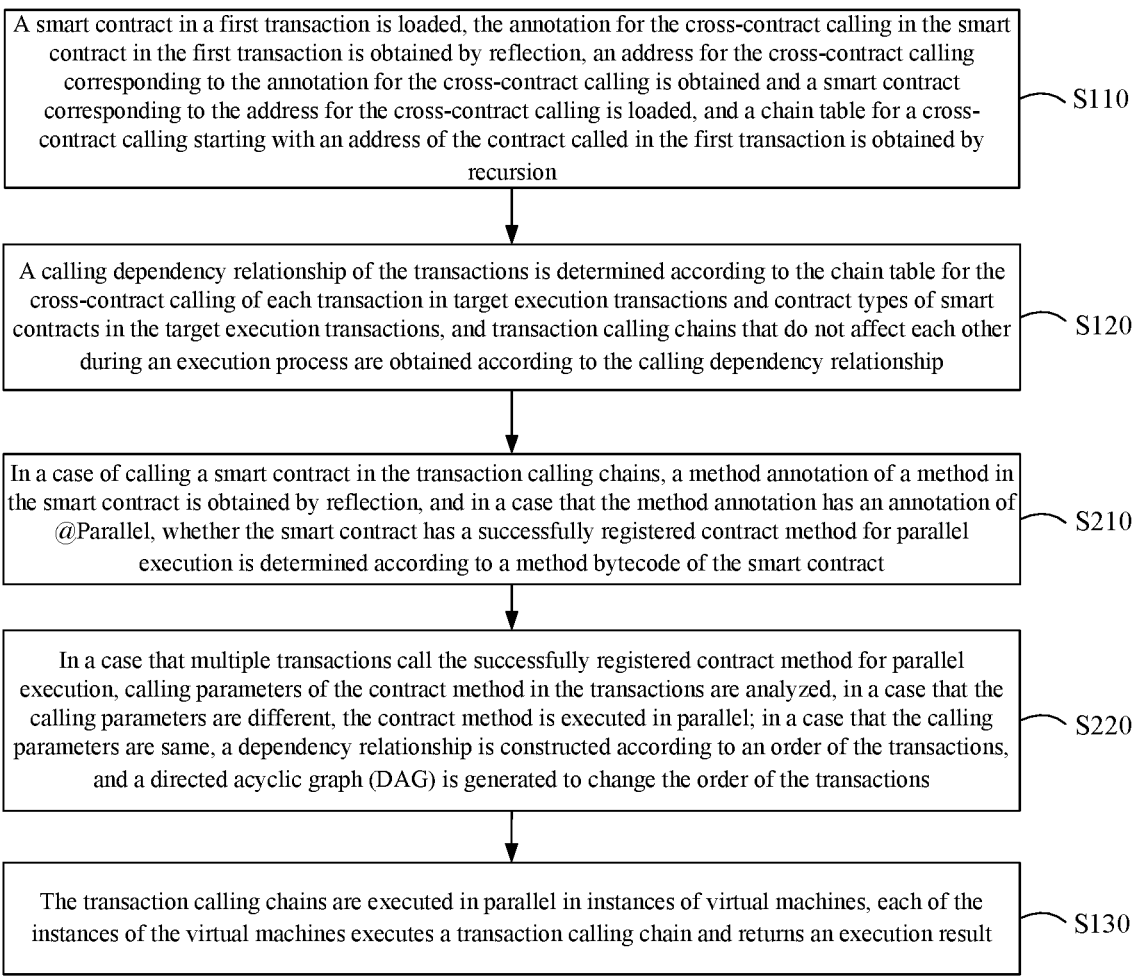
FIG. 2 is a flowchart diagram of a method for parallel execution of a single smart contract according to an embodiment of the present disclosure.

The above parallel execution of the smart contract includes an execution of a single contract, for the parallel execution of the single contract, FIG. 2 is a flowchart diagram of a method for parallel execution of a single smart contract according to an embodiment of the present disclosure. As shown in FIG. 2, in some embodiments of the present disclosure, after the transaction calling chains that do not affect each other during the execution process are obtained according to the calling dependency relationship, the method further includes: at step 210, in a case of calling a smart contract in the transaction calling chains, a method annotation of a method in the smart contract is obtained by reflection, and in a case that the method annotation has an annotation of @Parallel, whether the smart contract has a successfully registered contract method for parallel execution is determined according to a method bytecode of the smart contract. For example, in a case that an execution engine of the virtual machine of the contract is a Java virtual machine, the execution engine of the virtual machine accepts a contract file in a form of jar to be deployed on a blockchain platform, loads the contract file and initializes a contract instance through a custom class loader, and calls the smart contract through an interface. In some embodiments, the method in the smart contract is a member method of a contract class. The execution engine of the contract will scan the member method of the contract class through java reflection, and in a case that the member method of the contract class is scanned to have the annotation of @Parallel, a bytecode check on the member method of the contract will be performed to determine whether the member method of the contract is the successfully registered contract method for parallel execution, and the annotation of @Parallel is provided to the method, and only when the annotation is marked will a registration of parallel execution be performed.

At step 220, in a case that multiple transactions call the successfully registered contract method for parallel execution, calling parameters of the contract method in the transactions are analyzed, in a case that the calling parameters are different, the contract method is executed in parallel; in a case that the calling parameters are same, a dependency relationship is constructed according to an order of the transactions, and a directed acyclic graph (DAG) is generated to change the order of the transactions. The embodiment provided at step 210 and step 220 can improve the efficiency of execution of the single contract.

In some embodiments of the present disclosure, whether the smart contract has a successfully registered contract method for parallel execution is determined according to a method bytecode of the smart contract as follows: a number and a type of method parameters of the method in the smart contract with the annotation of @Parallel are obtained, the method parameters are parsed, a registration failure is determined in a case that the method parameters are operated by a modify type instruction or used as parameters to call other methods in the method bytecode, and the registration failure is determined in a case that the parameters is used by more than just a persistent variable of @StoreField. The method in the smart contract obtains the parameters from a local variable table of a current method stack frame. The embodiment provides a way to determine whether a contract method for parallel execution is registered successfully, allowing the determining of the method bytecode of the smart contract faster and more accurate through the method parameters.

In some embodiments of the present disclosure, after whether the smart contract has a successfully registered contract method for parallel execution is determined according to a method bytecode of the smart contract, in a case that the smart contract has the successfully registered contract method for parallel execution, a method signature in a state data of the contract method is saved, and the method signature includes a name of the contract method, the number of the method parameters, and the type of the method parameters. Since the method signature includes a name of the contract method, the number of the method parameters, and the type of the method parameters, it can ensure that there cannot be the same method signature in a contract, allowing the determination of the contract method more accurate.

In some embodiments of the present disclosure, the dependency relationship is constructed by generating the directed acyclic graph, when a transaction with a lower serial number and a transaction with a higher serial number have a parameter conflict, a dependency edge is created from the transaction with the higher serial number to the transaction with the lower serial number in the directed acyclic graph, and the serial number indicates an order in which the transaction is packed. For example, the blockchain node determines whether the parameters of the integral recharge interface are mutually exclusive in order, according to an order of transaction packing. If the parameters of the integral recharge interface are mutually exclusive with all previous transaction parameters (referring to the transaction including the contract method for parallel execution), the parameters of the integral recharge interface will be regarded as a separate node in the DAG with an output of 0. If the parameters of the integral recharge interface are the same as the previous transaction parameters, the current transaction will build the dependency edge from the previous transaction with the same parameters, mainly adding an input edge for the current transaction, adding an output edge for the previous transaction with similar parameters, and the dependency relationship points from the previous transaction to the current transaction. The DAG allows the dependency relationship more intuitive and unambiguous.

In a specific embodiment, for the parallel execution of a single contract, the execution engine of the virtual machine of the contract is the Java virtual machine, the execution engine of the virtual machine accepts the contract file in the form of jar to be deployed on the blockchain platform, loads the contract file and initializes the contract instance through the custom class loader, and calls the smart contract through the interface. When variables within a Java smart contract need to be saved to a blockchain ledger, the @StoreField annotation needs to be marked for member variables of the contract. The method in Java smart contracts is a member method of the contract class and is marked with the annotation of @Parallel to enable parallelism and is detected by a contract bytecode during deployment or upgrade. The annotation of @Parallel is provided to the method, and only when the annotation is marked will a registration of parallel execution be performed.

Figure 3:
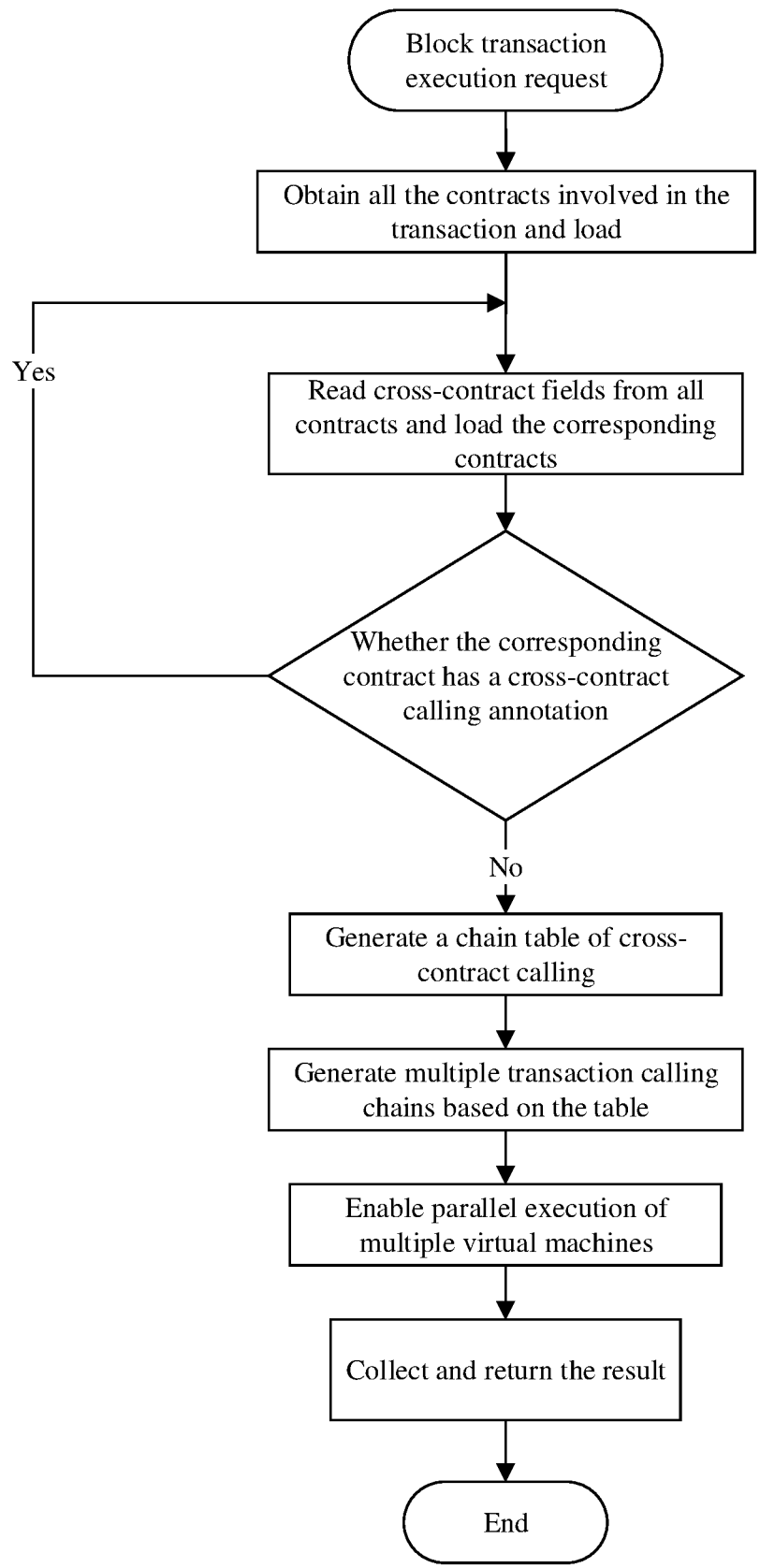
FIG. 3 is a schematic diagram of a smart contract deployed and registered in parallel in parallel execution of a single smart contract according to an embodiment of the present disclosure.

FIG. 3 is a schematic diagram of a smart contract deployed and registered in parallel in parallel execution of a single smart contract according to an embodiment of the present disclosure. As shown in FIG. 3, a blockchain DApp is used to explain. The Java smart contract recorded in the embodiment of the present disclosure can be an integral scenario, and the following parallel execution is detailed in the integral scenario as an example.

In an embodiment of the present disclosure, in order to promote consumption, different organizations adopt a reward policy of issuing integrals and providing consumers with integrals in exchange for physical objects. Integral recharge and exchange servers used by different organizations are regarded as blockchain nodes in a blockchain network, and a blockchain application for integral recharge and exchange are deployed on each blockchain server, which is the Java smart contract, and an open and transparent processing is achieved through a predefined logic of the contract, ensuring that the data is authentic and not tampered with, as well as to be able to share the integrals of the consumer among various organizations.

In FIG. 3, an agreement is reached between the organizations to initiate the deployment of the contract, which includes an ID of a consumer account to be stored and a corresponding integral value, as well as the physical objects which the corresponding integral value is redeemable for and a remaining quantity of the physical objects. While the Java smart contract provides the ability to allow the organizations to recharge the integrals generated by the consumer after consumption to a corresponding integral record account of the Java smart contract of the consumer, periodically put online some physical objects which the integrals are redeemable for at the same time, and finally provide the consumer with functions of integrals query, integrals redeemable in kind query and integrals redeemable in kind, thus this is a functional description of the Java smart contract for the integral scenario.

In the above Java smart contract, it is known that a user consumption is a very frequent thing, which also means that a large amount of integral recharge data of the user will be sent to the blockchain between different organizations. Integrals of the consumer are recharged through the above predefined smart contract, in a traditional blockchain scenario, the contract transactions need to be executed serially, which inevitably leads to a long server response time for the organizations to recharge integrals of the consumer, and eventually the blockchain nodes accumulate a large number of transactions waiting to be executed.

Through the above description, it can be found that the organization can perform parallel execution for integral recharge for the user without affecting the consistency of the final state of the blockchain network. Thus, before deploying the contract, the organization can describe the contract interface for integral recharge for consumers as a method for parallel execution of the Java smart contract by the annotation of @Parallel, with two parameters of the contract method, i.e., a contract account ID for the consumer and the number of integrals to be recharged. After the organization defines the function of the smart contract, the organization initiates the deployment of the contract. The security of the Java smart contract will be verified by the security of the blockchain node, and here the security of whether a recharging method is parallelizable will be verified.

The method of the Java smart contract, with the annotation of @Parallel, i.e., the interface for integral recharge, is analyzed, and a Java bytecode of the method is analyzed. It should be noted that when the execution engine of the virtual machine obtains the method marked with the annotation of @Parallel by reflection, the execution engine obtains a corresponding code attribute of the method from a class file of the Java bytecode. In a Java bytecode specification, the code attribute of the method includes all execution flows of the method. By analyzing the bytecode of the method in the class file, firstly, a number and a type of parameters of the method in the Java smart contract with the annotation of @Parallel are obtained, and it is known that the method in the Java smart contract obtains the parameters from a local variable table of a current method stack frame, and when a method stack frame is called, it is known that the variables in the local variable table of the method stack frame are the parameters of the current method. Secondly, it is parsed that whether method parameters obtained from the local variable table are operated by a modified type instruction or used as parameters to call other methods in a whole method bytecode, if yes, the registration will fail. Finally, it is determined that whether the parameters are only used by persistent variable of @StoreField, if no, then the registration will also fail.

It should be noted that a variable of @StoreField at the time of integral recharge is a mapping relationship table of the consumer account and the integral of the contract. If the contract method check meets the requirements, the blockchain node will register the method as a parallelizable contract, otherwise the registration fails. If the method of @Parallel is successfully determined to be parallel when the contract is deployed, the method signature of the current parallelizable method is stored in the state data of the contract. The method signature includes the name of the contract method and the number of method parameters and the type of method parameters, which can ensure that there can be no identical method signatures in a contract.

It should be noted that the properties of a method in the Java bytecode specification include the size of the local variable table that the method needs to use, the size of the depth of an operation stack that the method needs to use, and the specific instructions to execute. In the Java bytecode specification, a method signature includes a method name, a number and a type of method parameters. A method signature is guaranteed to be unique within a class.

It should be noted that getting method parameters from the local variable table without modification can be reflected by that whether modification instructions use the parameters in the local variables table. The fact that parameters can only be used by persistent variables modified by the annotation of @StoreField ensures that the stored data is concurrently safe in the case of different parameters.

Similarly, the contract will be scanned when performing contract upgrades, which will not be repeated here.

Figure 4:
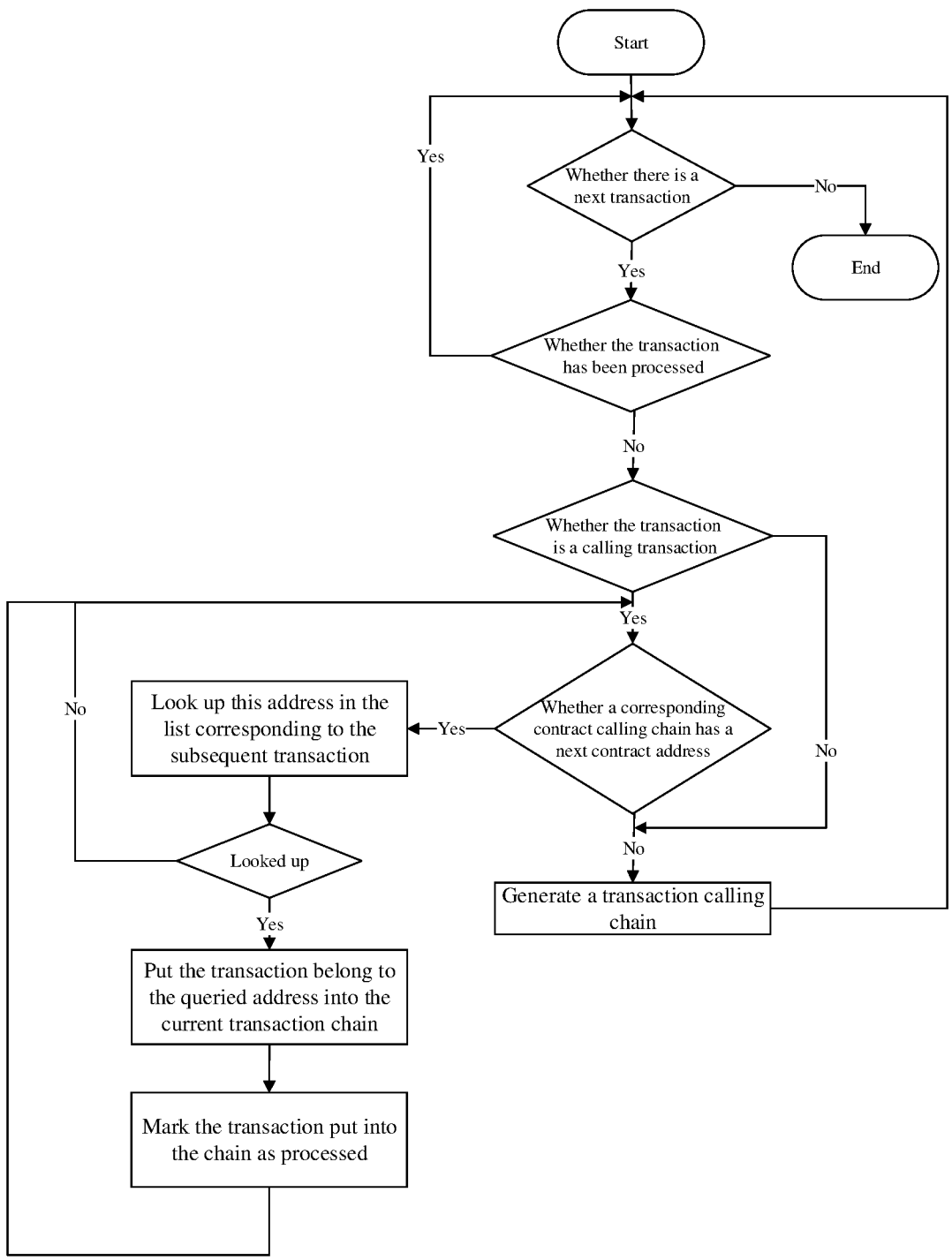
FIG. 4 is a flowchart diagram of parallel execution of a single smart contract according to an embodiment of the present disclosure.

FIG. 4 is a flowchart diagram of parallel execution of a single smart contract according to an embodiment of the present disclosure. As shown in FIG. 4, the organizations initiate the blockchain transaction of integral recharge, and the organizations have registered the parallelizable method successfully in the above step. After the blockchain nodes pack the transactions within a certain period of time and set the order, each node will execute the transactions for verification. When it is found to be a parallelizable contract method through the analysis of the calling parameters of the contract method of the transactions, a DAG analysis is performed for the contract method that can be executed in parallel. The registered method for parallel execution needs to be mutually exclusive in the method parameters when analyzed in parallel, i.e., the calling parameters of the contract method are not consistent. In the integral recharge interface of the organizations, when the parameters of the contract account of the consumer are inconsistent, the parallel execution can be performed.

The blockchain node determines whether the parameters of the integral recharge interface are mutually exclusive in order, according to an order of transaction packing. If the parameters of the integral recharge interface are mutually exclusive with all previous transaction parameters (referring to the transaction including the contract method for parallel execution), the parameters of the integral recharge interface will be regarded as a separate node in the DAG with an output of 0. If the parameters of the integral recharge interface are the same as the previous transaction parameters, the current transaction will build the dependency edge from the previous transaction with the same parameters, mainly adding an input edge for the current transaction, adding an output edge for the previous transaction with similar parameters, and the dependency relationship points from the previous transaction to the current transaction.

After the construction of the DAG is completed, according to an algorithm of topological sorting, the blockchain nodes parallelize all the transactions with the input of 0. After the execution is completed, the DAG is updated to reduce the input for the corresponding transactions, and all the transactions with the input of 0 are obtained again for parallel execution, and so on until the end of the cycle. Finally, all transactions are executed and the process is finished.

Figure 5:
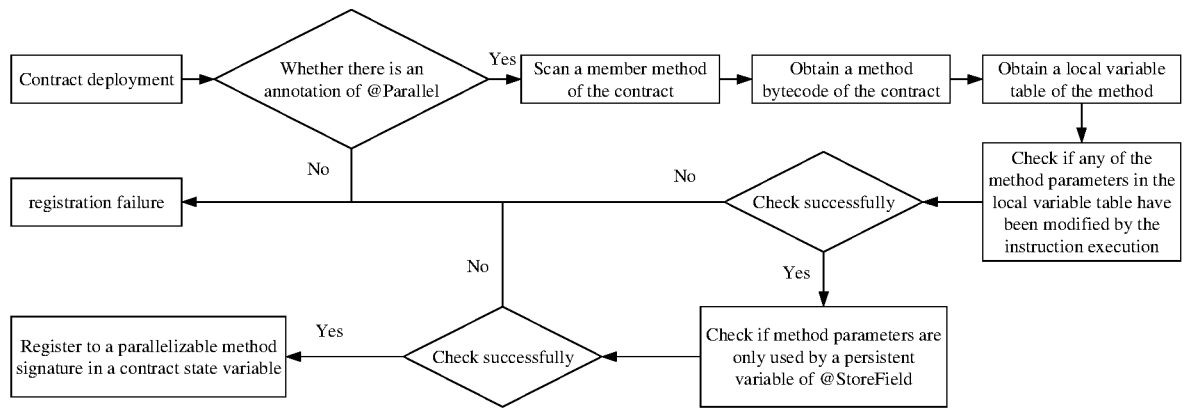
FIG. 5 is a flowchart diagram of a method for parallel execution of a smart contract according to an embodiment of the present disclosure.
Figure 6:
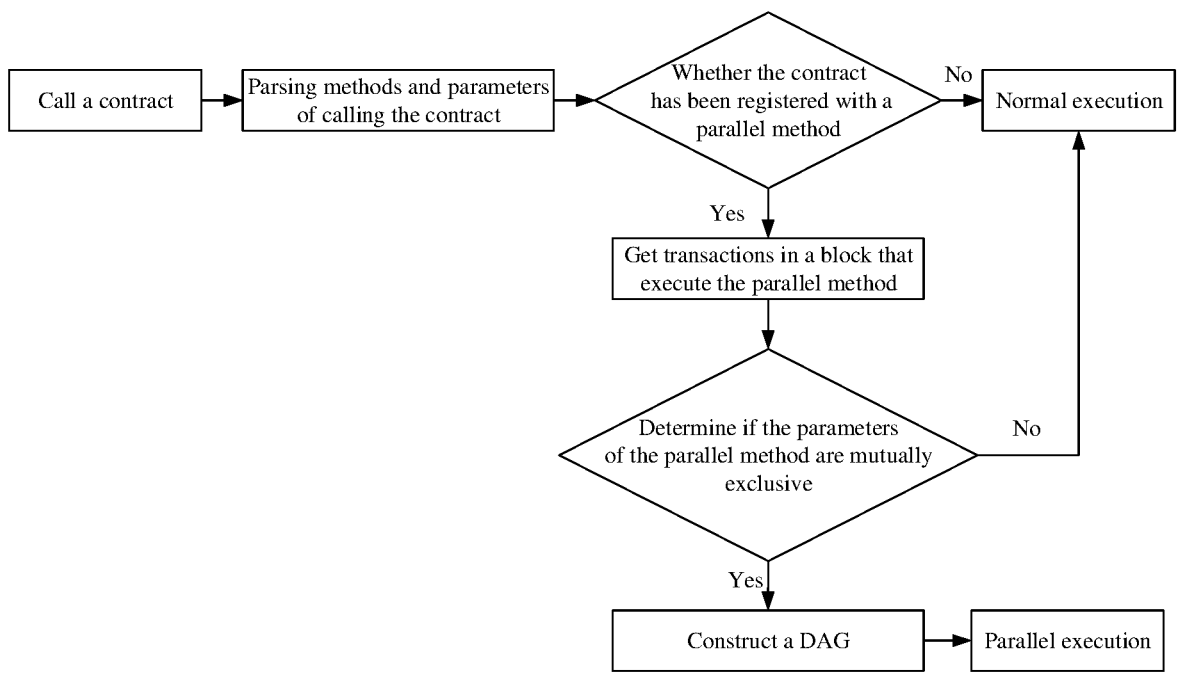
FIG. 6 is a flowchart diagram of obtaining transaction calling chains according to an embodiment of the present disclosure.

According to another aspect of the present disclosure, a method for parallel execution of a smart contract is provided. FIG. 5 is a flowchart diagram of a method for parallel execution of a smart contract according to an embodiment of the present disclosure. FIG. 6 is a flowchart diagram of obtaining transaction calling chains according to an embodiment of the present disclosure. As shown in FIG. 5 and FIG. 6, the smart contract includes the annotation for cross-contract calling, and the method for parallel execution is applied to the execution engine of the smart contract of the blockchain in the context of a federated chain, which is able to execute the transactions packaged into a block in parallel, and also ensures that no concurrency problems occurs with regard to the modification of all state quantities during the process of parallel execution of the transactions. This is a big breakthrough in the execution engine of the Java virtual machine under the execution engine of the blockchain virtual machine. The method specifically includes the following steps: at step one: when the blockchain node receives packaged transactions for execution, the blockchain firstly retrieves the corresponding contract source code from the ledger database according to the contract address specified in the transactions and loading the contract source code. At step two: for all contracts loaded, it is determined whether the annotation for the cross-contract calling is in the contracts through reflection, if yes, the address for the cross-contract calling is retrieved, the contract source code corresponding to the address from the ledger database is retrieved and loaded, and the analysis of the address for the cross-contract calling in the contracts is performed by recursion; finally, for each transaction, the chain table for the cross-contract calling starting with the address of the contract called by the current transaction is obtained; the chain table for the cross-contract calling involved is generated by analyzing the contract which is cross-contract called through recursion, including all the contract addresses involved in the current transaction execution with a length of at least 1, and when obtaining the annotation for the cross-contract calling, it is necessary to obtain all the annotations for the cross-contract calling in the contract. For each obtained annotation, a recursive analysis is required to finally obtain the calling chain table. As an embodiment, the ways the contract source code loaded and retrieved need to be consistent. At step three: a calling dependency analysis of all transactions is performed according to obtained contract calling chains corresponding to all transactions, when the contract of the transaction is a calling contract, the obtained contract calling chain corresponding to this contract is traversed at step two, if the contract calling chain includes a contract involved in other transaction, the two transactions are placed into a transaction calling chain, otherwise, the transaction is treated as a separate transaction calling chain; when the contract of the transaction is a deployment contract, the transaction is directly treated as a separate transaction calling chain. After performing the dependency analysis of all transactions, multiple transaction calling chains whose execution does not affect each other are finally obtained. When the contract calling chain corresponding to the called contract is traversed, all contract addresses involved in all other transactions must be compared, and whenever the same address is found to exist, then the two transactions need to be placed into a transaction calling chain. In other words, instead of terminating directly after finding a first identical address in a traversal process, the traversal continues to find all of identical addresses. At step four: the multiple transaction calling chains obtained in step three, whose execution does not affect each other, are executed in parallel in multiple instances of virtual machines opened in advance, each virtual machine executes a transaction calling chain serially, and at the end of the execution of the chains in all virtual machines, results are collected and then returned to an upper layer for other operations.

By opening multiple virtual machines, each of which is multi-threaded, a collection of results requires waiting for all virtual machines to finish execution before returning the results. By executing block transactions in parallel in the instances of the virtual machines, a multi-core feature of general computers and computing resources are fully utilized. Furthermore, by analyzing the dependency of transaction calling, it is ensured that no data concurrency problems arise during parallel execution of transactions. If the virtual machine does not return the result within the specified time, then all transactions executed by the virtual machine are directly determined to be illegal.

According to another aspect of the present disclosure, an apparatus for parallel execution of a smart contract is provided. The present disclosure is applied to the blockchain platform, provides a new apparatus for parallel execution of a single smart contract, realizes an analysis of the contract bytecode, a parallelizable method registration, an analysis of mutually exclusive parameters, provides a parallel execution scheme for contracts of the blockchain platform, while the analysis and registration of the parallelizable method will be performed both during contract deployment and upgrade.

The apparatus includes: a registering module configured for determining whether a method in a Java smart contract has an annotation of @Parallel, analyzing a Java bytecode of the method of the Java smart contract with the annotation of @Parallel, and determining whether the method is a successfully registered contract method for parallel execution; and a parsing module configured for determining whether the called contract has a successfully registered contract method for parallel execution firstly when initiating a contract calling, when multiple transactions in a current block call contract methods for parallel execution, a smart contract executor will analyze parameters passed to the contract methods in the transactions, and when the parameters for calling the contract are different, the contract methods will be executed in parallel; when the parameters are same, constructing a dependency relationship according to an order of the transactions in the block and generating a directed acyclic graph to change the order of the transactions.

Furthermore, the registering module includes: a parameter obtaining unit configured for obtaining a number and a type of parameters of the method in the Java smart contract with the annotation of @Parallel, and it is known that the method in the Java smart contract obtains the parameters from a local variable table of a current method stack frame, and when a method stack frame is called, it is known that the variables in the local variable table of the method stack frame are the parameters of the current method; a first parsing judgment unit configured for parsing whether method parameters obtained from the local variable table are operated by a modified type instruction or used as parameters to call other methods in a whole method bytecode, if yes, the registration will fail; and a second parsing judgment unit configured for determine whether the parameters are only used by persistent variable of @StoreField, if no, then the registration will also fail.

Figure 7:
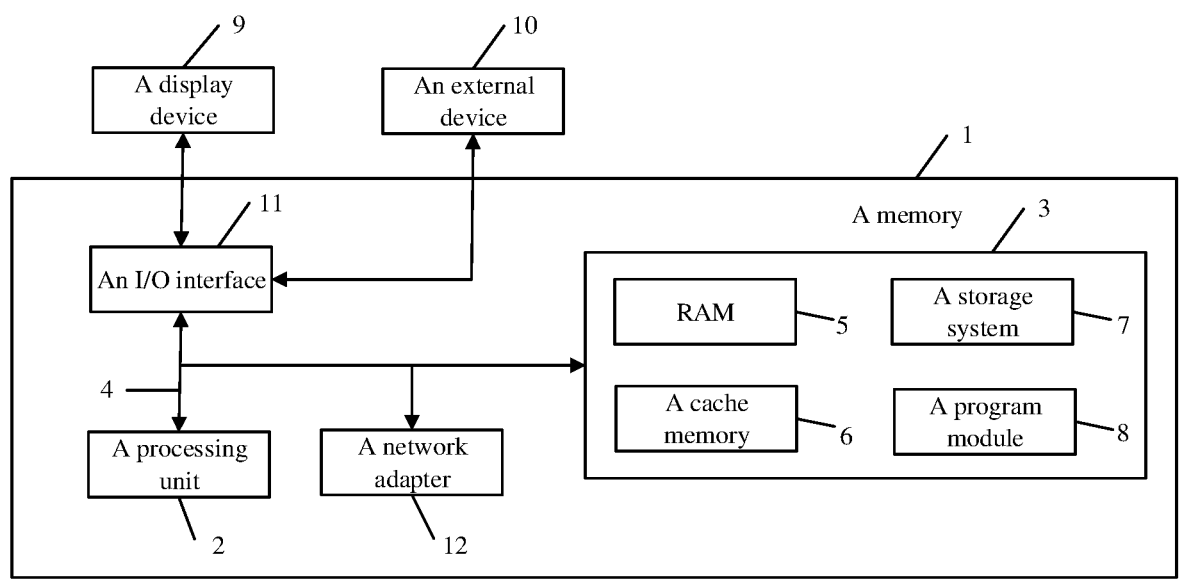
FIG. 7 is a schematic diagram of a device for parallel execution of a smart contract according to an embodiment of the present disclosure.

FIG. 7 is a schematic diagram of a device for parallel execution of a smart contract according to an embodiment of the present disclosure. As shown in FIG. 7, it is a block diagram of exemplary device 1 suitable for implementing embodiments of the present disclosure. The device shown in FIG. 7 is only an example and should not impose any limitation on the function and scope of use of the embodiments of the present disclosure. Device 1 can typically be a device that implements parallel execution of the single contract based on the Java smart contract.

As shown in FIG. 7, device 1 is represented as a general-purpose computing device. The components of device 1 may include, but are not limited to: one or more processors or processing unit 2, a memory 3, and a bus 4 connecting different system components including the memory 3 and the processing unit 2.

The bus 4 represents one or more of several types of bus structures, including a memory bus or a memory controller, a peripheral bus, a graphics acceleration port, a processor, or a local bus that uses any of several bus structures. For example, these architectures include, but are not limited to, the Industry Standard Architecture (ISA) bus, the Micro-channel Architecture (MAC) bus, the Enhanced ISA bus, the Video Electronics Standards Association (VESA) local bus, and the Peripheral Component Interconnection (PCI) bus.

The device 1 typically includes a variety of readable media of a computer system. These media may be any available media that can be accessed by the device 1, including volatile and non-volatile media, removable and non-removable media.

The memory 3 may include readable media of the computer system in the form of volatile memory, such as a random-access memory (RAM) 5 and/or a cache memory 6. The device 1 may further include other removable/non-removable, volatile/non-volatile storage media of the computer system. As an example, a storage system 7 can be used to read and write non-removable, non-volatile magnetic media (not shown in FIG. 3, commonly referred to as a "hard disk drive"). Although not shown in FIG. 7, the disk drive can be provided for reading and writing removable and non-volatile disks (such as a "floppy disk"), as well as an optical disk drive for reading and writing removable and non-volatile disks (such as CDROM, DVD-ROM, or other optical media). In these cases, each drive can be connected to the bus 4 through one or more data media interfaces. The memory 3 may include at least one program product having, for example, at least one set of program modules configured to perform the functions of embodiments of the present disclosure.

A set (at least one) of program modules Scan be stored in, for example, the memory 3. Such program modules 8 include, but are not limited to, an operating system, one or more applications, other program modules, and program data. Each or some combination of these examples may include an implementation of a network environment. The procedure modules 8 generally perform the functions and/or methods described in embodiments of the present disclosure.

The device 1can also communicated with one or more external devices 10 (such as a keyboard, a pointing device, a display device 9, etc.), but also with one or more devices enabling the user to interact with the device 1, and/or with any device (such as network cards, modems, etc.) which can allow the device 1 communicating with one or more other computing devices. This communication can take place through an input/output (I/O) interface 11. Moreover, the device 1 can also communicate with one or more networks (such as local area network (LAN), wide area network (WAN) and/or public networks, such as the Internet) through a network adapter 12. As shown, the network adapter 12 can communicate with the other modules of the device 1 through the bus 4. It should be understood that, although not shown in FIG. 3, additional hardware and/or software modules can be used in conjunction with the device 1, including but not limited to: a microcode, a device driver, a redundant processing unit, an external disk drive array, a RAID system, a tape drive, and a data backup storage system, etc.

The processing unit 2 can perform various functional applications and data processing by running the programs stored in the memory 3, such as realizing the method for parallel execution of a smart contract provided in embodiments of the present disclosure.

According to another aspect of the present disclosure, a computer-readable storage medium is provided. The computer-readable storage medium has stored a computer program, and the computer program is executed by a processor to implement a method for parallel execution of a single contract based on the Java smart contract.

A computer storage medium in the embodiment of the present disclosure may use any combination of one or more computer-readable media. The computer-readable media may be computer-readable signal media or computer-readable storage media. The computer-readable storage media may be, but are not limited to, such as a system, an apparatus or a device which of electrical, magnetic, optical, electro-magnetic, infrared, or semiconductor, or any combination of the above. More specific examples (not exhaustive lists) of computer-readable storage media include: an electrical connection with one or more wires, a portable computer disk, a hard disk, a random-access memory (RAM), a read-only memory (ROM), an erasable programmable read-only memory (EPROM or a flash memory), an optical fiber, a portable compact disk read-only memory (CDROM), an optical storage device, a magnetic storage device, or any suitable combination of the above. In the present disclosure, the computer-readable storage medium may be any tangible medium containing or storing a program that can be used by or in combination with a system, an apparatus or a device for instruction execution.

The computer-readable signal media may include data signals transmitted in a baseband or as part of a carrier wave, which carry computer-readable program code. Such transmitted data signals may take many forms, including, but not limited to, an electromagnetic signal, an optical signal, or any suitable combination of the above. The computer-readable signal media may also be any computer-readable medium other than a computer-readable storage medium, which may transmit, propagate or transmit programs configured for being used by or in combination with a system, an apparatus or a device for instruction execution.

The program code contained on the computer-readable media may be transmitted in any suitable medium, including but not limited to a wireless, a wire, an optical cable, a RF, etc., or any suitable combination of the above.

The computer program code used to perform the operations of the present disclosure may be written in one or more programming languages, or a combination thereof. The programming languages include object-oriented programming languages such as Java, Smalltalk, C++, as well as conventionally procedural programming languages, such as a "C" language or similar programming languages. The program code may be executed entirely or partially on a computer of the user, as a separate package, partially on the computer of the user, partially on a remote computer, or entirely on the remote computer or a server. In a case of the remote computer, the remote computer can be connected to the computer of the user over any kind of network, which includes a local area network (LAN) or a wide area network (WAN), or the remote computer can be connected to an external computer (for example, using an Internet service provider to connect over the Internet).

A person skilled in the art can understand, the above description is only a preferred example of the present disclosure, not used to limit the present disclosure, although with reference to the embodiment for a detailed explanation of the present disclosure, it is still possible for a person skilled in the art to modify the technical solutions described in the foregoing examples or to make equivalent substitutions for some of the technical features thereof. All modifications and equivalent substitutions made within the spirit and principles of the present disclosure shall be included in the scope of protection of the present disclosure.

We claim:

1. A method for parallel execution of a smart contract, wherein the smart contract comprises an annotation for a cross-contract calling, the method specifically comprises the following steps:

loading a smart contract in a first transaction, obtaining the annotation for the cross-contract calling in the smart contract in the first transaction by reflection, obtaining an address for the cross-contract calling corresponding to the annotation for the cross-contract calling and loading a smart contract corresponding to the address for the cross-contract calling, and obtaining, by recursion, a chain table for a cross-contract calling starting with an address of the contract called in the first transaction;

determining, according to the chain table for the cross-contract calling of each transaction in target execution transactions and contract types of smart contracts in the target execution transactions, a calling dependency relationship of the transactions, and obtaining, according to the calling dependency relationship, transaction calling chains that do not affect each other during an execution process, wherein the target execution transactions comprise the first transaction, and the contract types comprise a calling contract and a deployment contract; and executing the transaction calling chains in parallel in instances of virtual machines, each of the instances of the virtual machines executing a transaction calling chain and returning an execution result.

2. The method for parallel execution of the smart contract of claim 1, wherein the determining, according to the chain table for the cross-contract calling of each transaction in target execution transactions and contract types of smart contracts in the target execution transactions, the calling dependency relationship of the transactions comprises:

in a case that the contract type of the first transaction is the calling contract and the chain table for the cross-contract calling comprises a smart contract in a second transaction, placing the first transaction and the second transaction into the same transaction calling chain; and in a case that the contract type of the first transaction is the deployment contract, the first transaction forming a separate transaction calling chain.

3. The method for parallel execution of the smart contract of claim 1, wherein after the obtaining the annotation for the cross-contract calling in the smart contract in the first transaction by reflection, the method comprises:

obtaining the address for the cross-contract calling corresponding to the annotation for the cross-contract calling, obtaining contract source codes corresponding to the address for the cross-contract calling from a ledger database, and loading the contract source codes, wherein loading a plurality of the contract source codes is done in a consistent manner.

4. The method for parallel execution of the smart contract of claim 1, wherein the determining, according to the chain table for the cross-contract calling of each transaction in target execution transactions and contract types of smart contracts in the target execution transactions, the calling dependency relationship of the transactions comprises:

traversing the chain table for the cross-contract calling of each transaction in the target execution transaction, and determining, according to all contract addresses comprised in each chain table for the cross-contract calling and the contract types of the smart contracts in the target execution transaction, the calling dependency relationship for the transactions.

5. The method for parallel execution of the smart contract of claim 1, wherein after each of the instances of the virtual machines executing the transaction calling chain, the method comprises:

at the end of the execution of the transaction calling chains in all the instances of the virtual machines, returning execution results, and when one of the virtual machines does not return the execution result within a specified time, determining that all transactions executed by the virtual machine are illegal.

6. The method of claim 1, wherein before the obtaining, according to the calling dependency relationship, transaction calling chains that do not affect each other during the execution process, the method further comprises:

in a case of calling a smart contract in the transaction calling chains, obtaining a method annotation of a method in the smart contract by reflection, and in a case that the method annotation has an annotation of @Parallel, determining, according to a method bytecode of the smart contract, whether the smart contract has a successfully registered contract method for parallel execution; and in a case that multiple transactions call the successfully registered contract method for parallel execution, analyzing calling parameters of the contract method in the transactions, in a case that the calling parameters are different, executing the contract method in parallel; in a case that the calling parameters are same, constructing a dependency relationship according to an order of the transactions and generating a directed acyclic graph to change the order of the transactions.

7. The method for parallel execution of the smart contract of claim 6, wherein the method in the smart contract is a member method of a contract class.

8. The method for parallel execution of the smart contract of claim 7, wherein the obtaining the method annotation of the method in the smart contract by reflection, and in the case that the method annotation has the annotation of @Parallel, determining, according to the method bytecode of the smart contract, whether the smart contract has the successfully registered contract method for parallel execution comprises:

a contract execution engine scanning the member method of the contract class by java reflection, and in a case that the member method of the contract class is scanned to have the annotation of @Parallel, the contract execution engine performing a bytecode check on the member method of the contract to determine whether the member method of the contract is the successfully registered contract method for parallel execution.

9. The method for parallel execution of the smart contract of claim 6, wherein the determining, according to the method bytecode of the smart contract, whether the smart contract has the successfully registered contract method for parallel execution comprises:

obtaining a number and a type of method parameters of the method in the smart contract with the annotation of @Parallel, wherein the method in the smart contract obtains the parameters from a local variable table of a current method stack frame;

parsing the method parameters and determining a registration failure in a case that the method parameters are operated by a modify type instruction or used as parameters to call other methods in the method bytecode;

determining the registration failure in a case that the parameters is used by more than just a persistent variable of @StoreField.

10. The method for parallel execution of the smart contract of claim 6, wherein after the determining, according to the method bytecode of the smart contract, whether the smart contract has the successfully registered contract method for parallel execution, the method comprises:

in a case that the smart contract has the successfully registered contract method for parallel execution, maintaining a method signature in a state data of the contract method, and the method signature comprising a name of the contract method, the number of the method parameters, and the type of the method parameters.

11. The method for parallel execution of the smart contract of claim 6, wherein in a case that the calling parameters are same, constructing the dependency relationship according to the order of the transactions and generating the directed acyclic graph to change the order of the transactions comprises:

constructing the dependency relationship by generating the directed acyclic graph, when a transaction with a lower serial number and a transaction with a higher serial number have a parameter conflict, creating a dependency edge in the directed acyclic graph from the transaction with the higher serial number to the transaction with the lower serial number, wherein the serial number indicates an order in which the transaction is packed.

12. A method for parallel execution of a smart contract, wherein the smart contract comprises an annotation for a cross-contract calling, the method specifically comprises the following steps:

at step one: when a blockchain node receives packaged transactions for execution, the blockchain firstly retrieving a corresponding contract source code from a ledger database according to a contract address specified in the transactions and loading the contract source code;

at step two: for all contracts loaded, determining whether the annotation for the cross-contract calling is in the contracts through reflection, if yes, retrieving an address for the cross-contract calling, retrieving and loading a contract source code corresponding to the address from the ledger database, and performing an analysis of the address for the cross-contract calling in the contracts by recursion; finally, for each transaction, obtaining a chain table for the cross-contract calling starting with the address of the contract called by the current transaction;

at step three: performing a calling dependency analysis of all transactions according to obtained contract calling chains corresponding to all transactions, when the contract of the transaction is a calling contract, traversing the obtained contract calling chain corresponding to this contract at step two, if the contract calling chain comprises a contract involved in other transaction, placing the two transactions into a transaction calling chain, otherwise, the transaction being treated as a separate transaction calling chain; when the contract of the transaction is a deployment contract, the transaction being directly treated as a separate transaction calling chain; after performing the dependency analysis of all transactions, obtaining multiple transaction calling chains whose execution does not affect each other finally; and at step four: the multiple transaction calling chains obtained in step three, whose execution does not affect each other, being executed in parallel in multiple instances of virtual machines opened in advance, each virtual machine executing a transaction calling chain serially, and at the end of the execution of the chains in all virtual machines, results being collected and then returned to an upper layer for other operations.

13. The method for parallel execution of the smart contract of claim 12, wherein at step two, the chain table for the cross-contract calling comprising all contract addresses involved in a current transaction execution and having a length of at least 1.

14. The method for parallel execution of the smart contract of claim 12, wherein at step two, the ways the contract source code loaded and retrieved need to be consistent.

15. The method for parallel execution of the smart contract of claim 12, wherein at step three, when performing the analysis and comparison, all contract addresses involved in all other transactions must be compared, which means that instead of terminating directly after finding a first identical address in a traversal process, the traversal continuing to find all of identical addresses.

16. The method for parallel execution of the smart contract of claim 12, wherein at step four, when collecting the results, returning execution results only after all virtual machines finishing execution, if a virtual machine does not return within a specified time, then it is directly determined that all transactions executed by this virtual machine are illegal.

17. A device, comprising:
one or more processors;
a memory for storing one or more programs;
wherein when the one or more programs are executed by the one or more processors such that the one or more processors implement a method for parallel execution of a smart contract as follows:
determining whether a method in a Java smart contract has an annotation of @Parallel, analyzing a Java bytecode of the method of the Java smart contract with the annotation of @Parallel, and determining whether the method is a successfully registered contract method for parallel execution; and
determining whether the called contract has a successfully registered contract method for parallel execution firstly when initiating a contract calling, when multiple transactions in a current block call contract methods for parallel execution, a smart contract executor will analyze parameters passed to the contract methods in the transactions, and when the parameters for calling the contract are different, the contract methods will be executed in parallel; when the parameters are same, constructing a dependency relationship according to an order of the transactions in the block and generating a directed acyclic graph to determine the order of the transactions.

* * * * *